V. SUCHANEK.
MEANS FOR INDICATING AT A DISTANCE THE LEVEL OF LIQUIDS.
APPLICATION FILED JULY 1, 1913.

1,231,964.

Patented July 3, 1917.

WITNESSES:
Fred White
René Bruine

INVENTOR:
Venceslas Suchanek,
By Attorneys,

# UNITED STATES PATENT OFFICE.

VENCESLAS SUCHANEK, OF EAUBONNE, FRANCE, ASSIGNOR TO GASTON PIERRE POULALION AND GERMAIN ARSÈNE POULALION, BOTH OF PARIS, FRANCE.

MEANS FOR INDICATING AT A DISTANCE THE LEVEL OF LIQUIDS.

1,231,964. Specification of Letters Patent. Patented July 3, 1917.

Application filed July 1, 1913. Serial No. 776,772.

*To all whom it may concern:*

Be it known that I, VENCESLAS SUCHANEK, a subject of the Emperor of Austria, residing in Eaubonne, Seine-et-Oise, France, have invented certain new and useful Improvements in Means for Indicating at a Distance the Level of Liquids, of which the following is a specification.

This invention has for its object to provide an electrical arrangement for enabling the level of the liquid contained in a reservoir or tank to be read at a distance therefrom.

This arrangement is based on the known principle that between two points of an electric circuit, there exists a difference of potential, the value of which is equal to the product of the current multiplied by the resistance of the conductor between the two points, one of the points being rendered movable so that its position depends on that of the level of the liquid, the variations of potential difference will indicate the variations of this level.

The arrangement in accordance with this invention comprises essentially a resistance inserted in a main circuit and a float subjected to the variations of the level of the liquid, the movements of which cause the displacement of a contact on this resistance closing a contact maker in a shunt across this circuit, which shunt includes a measuring apparatus indicating the variations in the potential difference, which depend on the position of a float.

The measuring apparatus can be graduated in any suitable manner, for instance the graduations may indicate the heights of the liquid or it may indicate volumes. Devices are also provided to rectify errors arising from variations of the electro-motive force of the source of electricity feeding the circuit.

I will describe my invention with reference to the accompanying drawing showing by way of example an arrangement according to my invention.

Figure 1:
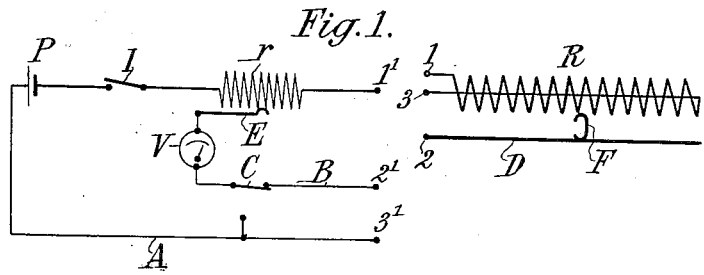
Fig. 1 is a diagram of the connections.

The principle of the invention will be understood from the diagram Fig. 1 from which it will be seen that the arrangement comprises two posts or stations. The first post or station is located at the place where the reservoir or tank is erected and comprises a resistance R to be connected to terminals 1 and 3 of a main circuit A and a float F subjected to the variations of the level of the liquid in the reservoir or tank, and carrying a contact capable of closing at a variable point of the resistance R, a shunt B across the main circuit through the medium of a conducting member D connected to the said shunt by means of a terminal 2.

The second post or station is situated at a distance from the reservoir or tank, at the place where it is desired to read the indications of the arrangement and consists essentially of an electrical measuring apparatus, such as a voltmeter V in the aforesaid shunt B. This second post or station is also provided with a source of electricity consisting of a battery P feeding the main circuit A. A switch I is arranged in the circuit and another switch C enables the short circuit to be made between the shunt and the main circuit to prevent the current from flowing to the first post. For reasons hereinafter given, the closing of the shunt on the main circuit also takes place at this second post at a variable point, through a resistance $r$ included in the circuit and a rider E connected to the shunt.

All the parts of the second post or station are inclosed in a box on which are arranged externally the dial of the measuring apparatus, the two knobs of the switch C and switch I, the handle of the rider E and the terminals $1^1$, $2^1$, $3^1$ to which are attached the wires connecting the two posts or stations.

It is clear that the indications of the voltmeter will be influenced by the position of the float F and that if the magnitudes of the resistances $r$ and R and the deflection of the voltmeter index for a determined potential difference are suitably selected the index of this voltmeter will be at the end of its graduation when the float closes the shunt on one end of the resistance and at the beginning of its graduation when the said float closes the shunt at the other end of the resistance R.

By taking into account the total length of the resistance R expressed say in centimeters the voltmeter may be graduated to indicate centimeters, or else as the dimensions of the reservoir or tank are known, the graduation of the voltmeter may be made to indicate directly units of volume or liters.

In lieu of a voltmeter an ammeter, a galvanometer or any other suitable electrical measuring apparatus may be used.

The parts of the first station or post are so collected together as to form an apparatus capable of being secured to a suitable part of the tank. This may be constituted as follows:—

Figure 2:
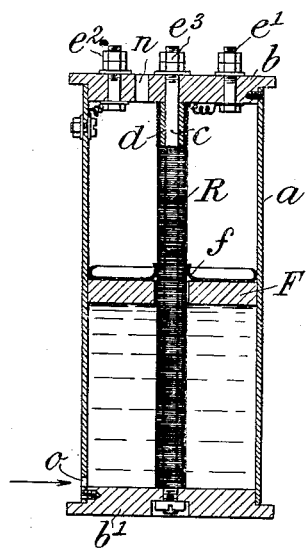
Figs. 2 and 3 are a vertical section and a plan respectively of an apparatus forming part of the arrangement.

The apparatus comprises a metal tube $a$ (Fig. 2) having two ends $b$ $b^1$ of insulating material such as fiber, into the lower end $b^1$ is screwed a metal rod $c$ which passes through the top end $b$ and is surrounded by a tube of fiber $d$ on which is wound the resistance R connected on the one hand to the rod $c$ and on the other hand to a terminal $e^1$ secured to the outside of the top end $b$. In the tube $a$ which has at its lower part an aperture $o$ for communicating with the reservoir or tank, is a float F which carries a metal disk $f$ through the center of which the resistance R passes. The disk is slightly flanged as shown in the drawing for the purpose of insuring a contact with the resistance R and the tube $a$ thus closing the circuit between the said resistance and tube. The top end $b$ which is provided with holes $n$ for maintaining the inside of the tube $a$ at the atmospheric pressure, also carries two other external terminals one of which $e^2$ is connected to the tube $a$ and the other $e^3$ to the rod $c$. The three terminals $e^1$, $e^2$, $e^3$ correspond to the three terminals 1, 2, 3, of Fig. 1.

The main current enters through the resistance R and leaves through the rod $c$ while the shunt current enters through the tube $a$ and leaves through the resistance R.

Figure 4:
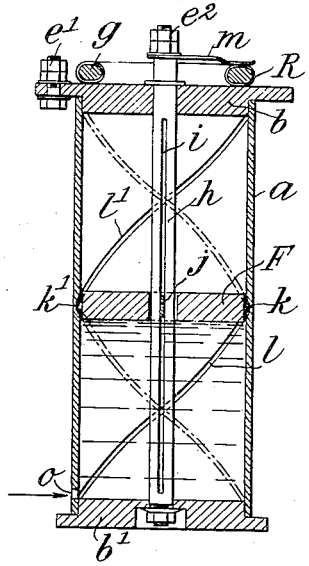
Figs. 4 and 5 are a vertical section and a plan respectively of a modification of the apparatus shown in Figs. 2 and 3.
Figure 3:
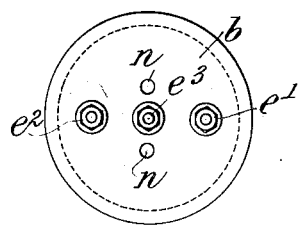
Figure 5:
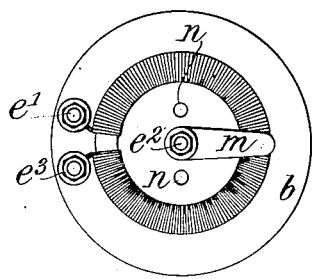

This arrangement can only be used when the liquids have no tendency to clog the contacts and attack the metal. For liquids presenting such a tendency the apparatus is constructed as shown in Figs. 4 and 5.

The resistance R is wound on a ring $g$ placed outside the tube $a$ which communicates with the reservoir and contains the float F. Through the center of the float F passes a rod $h$ capable of turning on its axis and provided with a straight groove $i$ engaging with a pin $j$ on the float. This float carries at its upper parts, two snugs $k$ and $k^1$ engaging with helical grooves $l$ $l^1$ provided in the inner wall of the tube $a$ the pitch of which helical groove is equal to the length of the resistance R. To the rod $h$ is secured externally to the tube $a$ a blade spring $m$, which is intended to bear on the resistance R. The two ends of the resistance are connected to terminals $e^1$ and $e^3$ while the blade $m$ is connected to the terminal $e^2$ arranged at the end of the rod $h$. When the float F moves under the action of the variations of level of the liquid, it rotates by virtue of the engagement of its snugs $k$ $k^1$ with the helical grooves $l$ $l^1$ and thus causes the blade spring $m$ to move over the resistance R. The working is the same as that hereinbefore described, the only difference being that the contacts are not integral with the float and are not exposed to the action of the liquid.

The resistance R must have sufficient value that the resistance of the contact $f$ or $m$ can be neglected when compared with that of the circuit. The measuring apparatus could also be placed in the main circuit, but the arrangement described is that which is preferable to obtain a great resistance in the shunt circuit without having to use for the resistance R, wires of too small a cross sectional area.

In order that the readings of the apparatus be always correct, it is necessary that the electro-motive force should always be the same. Now the sources of electricity which may be practically used in the present case are dry cells which do not always give the same electric tension at the terminals and for which this tension is not constant. For this reason the arrangement with a movable rider E on a resistance $r$ has been provided. After short circuiting the shunt B by means of the switch C the potential difference is measured. If a difference is found between it and that which should be indicated, which is marked on the voltmeter, by special line or stroke, the rider E is moved along the resistance $r$ until the pointer of the voltmeter has returned to the division indicated by the special line or stroke; the apparatus is thus brought back to the condition in which it was at the time it was graduated.

What I claim is:—

1. An electrical arrangement for indicating at a distance the levels of a liquid comprising at a first post or station a tank or reservoir for liquid, a float in said tank following the variations of level of the liquid, a resistance inserted in the main circuit, a contact-making member so connected to the float as to follow its movements and close at a variable point on the said resistance a shunt across the said main circuit, and at a second post or station at any distance from the tank or reservoir, a source of electricity feeding the main circuit, a switch for this circuit, an electrical measuring instrument in the shunt whose indications depend on the position of the contact-making member on the said resistance, a switch permitting the main circuit to be short-circuited on the shunt, another resistance included in the main circuit and a rider closing the shunt at a variable point of this second resistance so as to keep constant the initial indications of the measuring instrument in spite of the variations of the electro-motive force of the source of electricity.

2. An electrical arrangement for indicating the level of a liquid comprising a member movable incident to the variations of level of the liquid, a resistance inserted in the main circuit, a contact-making member controlled by the movements of said movable member for closing at variable points on the resistance a shunt across the main circuit, a source of electricity feeding the main circuit, a switch for this circuit, an electrical measuring instrument in the shunt whose indications depend on the position of the contact-making member on the said resistance, a switch for short circuiting the main circuit to the shunt, another resistance included in the main circuit and means for closing the shunt at a variable point of this second resistance to keep constant the initial indications of the measuring instrument in spite of the variations of the electro-motive force of the source of electricity.

In witness whereof, I have hereunto signed my name in the presence of two subscribing witnesses.

VENCESLAS SUCHANEK.

Witnesses:
 ARSÈNE POULALION,
 GABRIEL BELLIARD.